(12) United States Patent
Kobayashi

(10) Patent No.: US 12,434,700 B2
(45) Date of Patent: Oct. 7, 2025

(54) TRAVELING CONTROL APPARATUS

(71) Applicant: SUBARU CORPORATION, Tokyo (JP)

(72) Inventor: Hiroto Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 122 days.

(21) Appl. No.: 18/393,542

(22) Filed: Dec. 21, 2023

(65) Prior Publication Data

US 2024/0140423 A1 May 2, 2024

Related U.S. Application Data

(63) Continuation of application No. PCT/JP2021/039338, filed on Oct. 25, 2021.

(51) Int. Cl.
*B60W 30/16* (2020.01)

(52) U.S. Cl.
CPC ....... *B60W 30/162* (2013.01); *B60W 2552/10* (2020.02); *B60W 2554/4042* (2020.02); *B60W 2554/4045* (2020.02); *B60W 2554/406* (2020.02); *B60W 2554/802* (2020.02); *B60W 2554/804* (2020.02); *B60W 2720/106* (2013.01); *B60W 2754/30* (2020.02)

(58) Field of Classification Search
CPC .......... B60W 30/162; B60W 2552/10; B60W 2554/4042; B60W 2554/4045; B60W 2554/406; B60W 2554/802; B60W 2554/804; B60W 2720/106; B60W 2754/30; B60W 30/165; B60W 30/18163; B60W 30/16

See application file for complete search history.

(56) References Cited

U.S. PATENT DOCUMENTS

2017/0080940 A1* 3/2017 Ito .................. B60W 10/18

FOREIGN PATENT DOCUMENTS

| JP | H07-040758 A | 2/1995 |
|---|---|---|
| JP | 2007-69797 A | 3/2007 |
| JP | 2011-06007 A | 1/2011 |
| JP | 2012-51503 A | 3/2012 |

(Continued)

OTHER PUBLICATIONS

International Search Report issued in International Patent Application No. PCT/JP2021/039338, dated Dec. 21, 2021 w/English Translation.

*Primary Examiner* — Ashley L Redhead, Jr.
(74) *Attorney, Agent, or Firm* — Rimon P.C.

(57) ABSTRACT

A traveling control apparatus includes a computer device configured to perform control that causes a first vehicle to travel at a set constant vehicle speed or to travel following a second vehicle traveling in front of the first vehicle. The computer device is configured to set a third vehicle traveling on a merging lane merging with a traveling lane of the first vehicle and having an intention to enter a traveling lane of the first vehicle as a target to follow, and, when the third vehicle is set as the target to follow, perform a merge-to-follow process in which an inter-vehicular distance is allowable which is shorter than a target inter-vehicular distance set in the control that causes the first vehicle to travel following the second vehicle traveling on the traveling lane of the first vehicle.

8 Claims, 8 Drawing Sheets

(56) References Cited

FOREIGN PATENT DOCUMENTS

| | | |
|---|---|---|
| JP | 2017-61167 A | 3/2017 |
| JP | 2019-209701 A | 12/2019 |
| JP | 2020-66327 A | 4/2020 |

\* cited by examiner

100%

50%

0%

TRAVELING CONTROL APPARATUS

CROSS REFERENCES TO RELATED APPLICATIONS

This application is continuation of International Application No. PCT/JP2021/039338, filed on Oct. 25, 2021, the entire contents of which are hereby incorporated by reference.

BACKGROUND

The disclosure relates to a traveling control apparatus to be mounted in a vehicle.

Japanese Unexamined Patent Application Publication No. 2019-209701 discloses a technique that sets an imaginary vehicle and causes an own vehicle to travel following the imaginary vehicle so that traveling with smooth acceleration or deceleration is achieved even when another vehicle cuts in between the own vehicle and a preceding vehicle while the own vehicle is traveling following the preceding vehicle.

SUMMARY

An aspect of the disclosure provides a traveling control apparatus including a computer device. The computer device is configured to perform control that causes a first vehicle to travel at a set constant vehicle speed or to travel following a second vehicle traveling in front of the first vehicle. The computer device is configured to set a third vehicle detected on a merging lane as a target to follow. The merging lane merges with a traveling lane of the first vehicle. The computer device is configured to, when the third vehicle is set as the target to follow, perform a merge-to-follow process in which an inter-vehicular distance is allowable which is shorter than a target inter-vehicular distance set in the control that causes the first vehicle to travel following the second vehicle traveling on the traveling lane of the first vehicle. The computer device is configured to, when an acceleration rate of the third vehicle set as the target to follow is less than a predetermined threshold and a lap rate between the third vehicle and the first vehicle is zero, invalidate a target acceleration rate determined with setting the third vehicle as the target to follow, and perform the control that causes the first vehicle to travel following the second vehicle traveling on the traveling lane of the first vehicle.

An aspect of the disclosure provides a traveling control apparatus including a computer device. The computer device is configured to perform control that causes a first vehicle to travel at a set constant vehicle speed or to travel following a second vehicle traveling in front of the first vehicle. The computer device is configured to set a third vehicle detected on a merging lane as a target to follow. The merging lane merges with a traveling lane of the first vehicle. The computer device is configured to, when the third vehicle is set as the target to follow, perform a merge-to-follow process in which an inter-vehicular distance is allowable which is shorter than a target inter-vehicular distance set in the control that causes the first vehicle to travel following the second vehicle traveling on the traveling lane of the first vehicle. The computer device is configured to limit an upper limit of a target acceleration rate to an acceleration rate corresponding to throttle-off in the merge-to-follow process when a side face of the third vehicle set as the target to follow is recognized and a rear face of the third vehicle set as the target to follow is not recognized, the. The computer device is configured to change the target inter-vehicular distance to a smaller value in the merge-to-follow process when the rear face of the third vehicle set as the target to follow is recognized and it is determined based on a relative speed and an inter-vehicular distance between the third vehicle and the first vehicle that deceleration is to be made.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
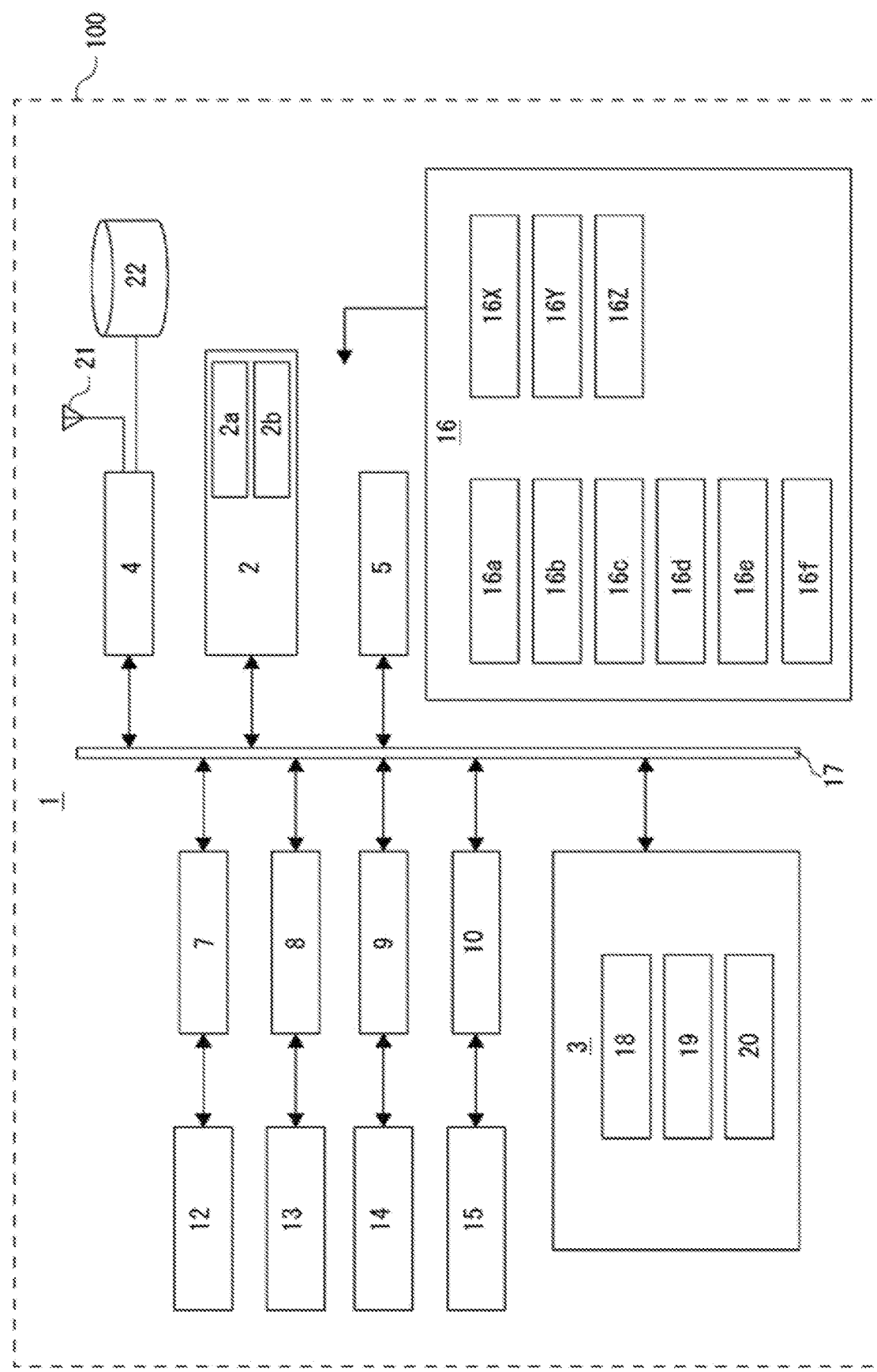
FIG. 1 is a block diagram of a vehicle control system according to one example embodiment.

In adaptive cruise control (ACC), traveling control of an own vehicle is performed so that a target inter-vehicular distance is maintained between the own vehicle and a preceding vehicle by setting a target acceleration rate based on speeds of the own vehicle and the preceding vehicle and an inter-vehicular distance between the own vehicle and the preceding vehicle.

Even when another vehicle that is traveling on a merging lane and estimated to merge into a position in front of the own vehicle is detected in the vicinity of an interchange or a rest area while the own vehicle is traveling using the ACC on a main lane of a limited highway such as an expressway, the other vehicle is not set as a target of the ACC to follow before the other vehicle actually merges into the position in front of the own vehicle and is recognized by a preceding vehicle.

This arises a situation where the own vehicle travels in parallel to the other vehicle estimated to merge or a comparable situation, hindering the other vehicle from merging into the main lane.

When the other vehicle actually merges into the position in front of the own vehicle, the other vehicle is recognized as a preceding vehicle of the own vehicle, and set as a target of the ACC to follow. In this case, the own vehicle can undergo strong braking to maintain an inter-vehicular distance with respect to the target to follow for safety. This can disturb a smooth traffic flow.

With the concerns described above, a driver who drives the own vehicle has to pay more attention to the use of the ACC while traveling in a merging area of the main lane than while traveling in an area other than the merging area of the main lane, or has to turn off the ACC.

It is desirable to provide a traveling control apparatus that makes it possible to achieve smooth traveling while maintaining ACC even upon merging.

In the following, some example embodiments of a traveling control apparatus of the disclosure are described with reference to the accompanying drawings. The traveling control apparatus is to be mounted in a vehicle, and serves as a part of a vehicle control system of the vehicle.

In the following description, a "merging vehicle" corresponds to a vehicle present on a merging lane for merging into a lane on which an own vehicle is traveling and detected by the own vehicle. For example, another vehicle traveling on a merging lane and intending to enter the lane on which the own vehicle is traveling may be detected as the merging vehicle.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Configuration of Vehicle Control System

FIG. 1 illustrates an exemplary configuration of a vehicle control system 1. Being mounted in a vehicle 100, the vehicle control system 1 performs traveling control of the vehicle 100 (hereinafter also referred to as an own vehicle).

The vehicle control system 1 includes multiple pieces of hardware. As one of the multiple pieces of hardware in the vehicle control system 1, a traveling control apparatus 2 according to an example embodiment may be provided.

FIG. 1 illustrates an example of the vehicle control system 1 to be mounted in the vehicle 100. The vehicle control system 1 may include the traveling control apparatus 2. The vehicle control system 1 may perform adaptive cruise control (ACC) to cause the own vehicle to travel at a set vehicle speed or to travel following a preceding vehicle.

Note that FIG. 1 illustrates main components relevant to the disclosure out of the components of the vehicle control system 1. The vehicle control system 1 may thus include components not illustrated in FIG. 1 or may not include all the components illustrated in FIG. 1.

The vehicle control system 1 may include the traveling control apparatus 2, an outside environment recognition apparatus 3, a map locator 4, a communicator 5, an engine processor 7, a transmission processor 8, a brake processor 9, a steering processor 10, an engine-related actuator 12, a transmission-related actuator 13, a brake-related actuator 14, a steering-related actuator 15, and a sensor-operator unit 16.

The vehicle control system 1 may further include a global navigation satellite system (GNSS) receiver 21 that is a receiver for a GNSS, for example, and a map database (DB) 22 that includes high resolution map data.

The traveling control apparatus 2, the outside environment recognition apparatus 3, the communicator 5, the map locator 4, the engine processor 7, the transmission processor 8, the brake processor 9, and the steering processor 10 may be mutually coupled via a bus 17.

The outside environment recognition apparatus 3 may be an apparatus configured to recognize an outside environment of the vehicle 100 to acquire outside environment information. The outside environment recognition apparatus 3 may be a microcomputer including, for example, a central processing unit (CPU), a read only memory (ROM), or a random access memory (RAM).

The outside environment recognition apparatus 3 may include a stereo camera 18 configured to capture an image of an environment in front of the vehicle 100, an image processor 19 configured to conduct various processes on the images acquired from the stereo camera 18, a radar device 30 such as a millimeter-wave radar or a laser radar, and another sensing device.

The stereo camera 18 may include multiple imaging units. Each of the imaging unit may include a camera optical system and an imaging device. An image of a subject may be focused on an imaging face of the imaging device by the camera optical system, generating electric signals on a pixel unit basis depending on the volume of received light. Each of the imaging units may be provided to enable ranging based on a stereo imaging method. The electric signal generated at each of the imaging units may be converted into a digital image signal indicating a luminance value on a pixel unit basis based on a predetermined gradation through an A/D conversion or a predetermined correction process, and may be supplied to the image processor 19.

The image processor 19 may be a microcomputer including, for example, a CPU, a ROM, or a RAM. To recognize the outside environment, the image processor 19 may execute predetermined image processing on captured image data obtained by the imaging units of the stereo camera 18, for example. The image processing by the image processor 19 may be performed using a memory such as a non-volatile memory included in the outside environment recognition apparatus 3.

The image processor 19 may execute various kinds of image processing based on the captured image data obtained by stereo imaging to acquire information on the environment in front of the own vehicle including a data on a three-dimensional object or a dividing lane (e.g., a center line or a lane dividing line) present in front of the own vehicle. Thereafter, the image processor 19 may detect a road or lane on which the own vehicle is traveling (an own vehicle traveling lane), and an object present on the own vehicle traveling lane, based on the information acquired. For example, the image processor 19 may detect a preceding vehicle traveling in front of the own vehicle, a lane line, a guardrail extending along the road, a sidewall of a curbstone, a three-dimensional object such as a vehicle, a stop line, a traffic light, a railroad crossing, a crosswalk, and a lane. Further, the image processor 19 may be configured to detect a vehicle traveling in parallel to the own vehicle depending on a view angle or an arrangement of the stereo camera 18. The vehicle traveling in parallel to the own vehicle may be a merging vehicle traveling on a merging lane, for example.

Further, the image processor 19 may be configured to recognize an object present around the own vehicle and a behavior of the object based on the image captured by the stereo camera 18. For example, the image processor 19 may further configured to recognize speeds, acceleration rates, changes in traveling directions, and lighting states of turn signal lamps of the preceding vehicle and the merging vehicle. Note that the acceleration rate may be an acceleration rate taking a positive value for acceleration or an acceleration rate taking a negative value for deceleration.

The image processor 19 may calculate the various pieces of surrounding environment information described above per frame of the captured image data, and may store the calculated information in the memory in sequence.

The traveling control apparatus 2 may be a microcomputer including a CPU, a ROM, or a RAM, for example. The traveling control apparatus 2 may execute various traveling control processes to assist driving of the own vehicle based on data received from various sensors in the outside environment recognition apparatus 3, the map locator 4, the communicator 5, and the sensor-operator unit 16 or operation input information, for example.

The traveling control apparatus 2 may be connected to the respective processors including the engine processor 7, the transmission processor 8, the brake processor 9, and the steering processor 10 via the bus 17. The traveling control apparatus 2 may be configured to establish mutual data communication with these processors. The traveling control apparatus 2 may send a command to some of the above-described processors to be operated for conducting an operation relevant to the driver assistance (driver assistance control).

Examples of the driver assistance control executed by the traveling control apparatus 2 may include automated lane keeping control, autonomous emergency braking (AEB) control, adaptive cruise control (ACC), and automated lane changing control.

As illustrated in FIG. 1, the traveling control apparatus 2 may include a control target setting unit 2a and a following control unit 2b. These units may perform processes relevant to the ACC, and these processes may be implemented by program modules.

The control target setting unit 2a may perform a process for setting a target of the ACC to follow. The control target setting unit 2a may be configured to set a preceding vehicle traveling in front of the own vehicle as the target of the ACC to follow in normal conditions. However, according to the present example embodiment, the control target setting unit 2a may be also configured to set a merging vehicle detected on a merging lane as a target of the ACC to follow.

The following control unit 2b may perform a process for setting a target acceleration rate to cause the own vehicle to travel following the target of ACC to follow (e.g., a preceding vehicle) while maintaining a target inter-vehicular distance, for example. According to the present example embodiment, the following control unit 2b performs a merge-to-follow process when a merging vehicle is set as the target to follow. In the merge-to-follow process, an inter-vehicular distance is allowable which is shorter than the target inter-vehicular distance set in the ordinary process for causing the own vehicle to travel following a preceding vehicle traveling on the same lane as the own vehicle.

The communicator 5 may be configured to establish a network communication, an inter-vehicular communication (a so-called V2V communication), or a road-to-vehicle communication. The traveling control apparatus 2 may acquire various pieces of information received by the communicator 5. The communicator 5 may be further configured to acquire various pieces of information, such as information on a surrounding environment around a current location and road information, via a network communication such as the Internet.

The sensor-operator unit 16 may be an assembly of various sensors and operators provided in the vehicle 100. Examples of the sensors in the sensor-operator unit 16 may include a vehicle speed sensor 16a that detects a speed of the own vehicle, an engine revolution sensor 16b that detects the number of revolutions of an engine, an accelerator position sensor 16c that detects an accelerator position based on the degree of depressing of an accelerator pedal, a steering angle sensor 16d that detects a steering angle, a yaw rate sensor 16e that detects a yaw rate, and a brake switch 16f that turns on or off in accordance with activation or inactivation of the brake pedal.

Examples of the operators in the sensor-operator unit 16 may include an ignition switch 16X that sends a command to start or stop the engine, an operation lever 16Y of a turn-signal lamp, and an operator 16Z that switches a control mode of an operation relevant to driver assistance control, such as ACC, between ON and OFF.

Note that these examples are mere examples and various kinds of sensors and operators may be provided other than those described above.

Various detection signals and operation signals may be sent from the sensor-operator unit 16 to components to be operated, such as the traveling control apparatus 2, the engine processor 7, the transmission processor 8, the brake processor 9, and the steering processor 10.

The engine processor 7 may control various actuators provided as the engine-related actuator 12 based on detection signals received from predetermined sensors in the sensor-operator unit 16 and operational input information received from predetermined operators in the sensor-operator unit 16, for example.

As the engine-related actuator 12, various actuators relevant to engine driving, such as a throttle actuator that drives a throttle valve and an injector that injects a fuel may be provided, for example.

The transmission processor 8 may control various actuators provided as the transmission-related actuator 13 based on detection signals received from predetermined sensors in the sensor-operator unit 16 and operational input information received from predetermined operators in the sensor-operator unit 16, for example.

As the transmission-related actuator 13, an actuator that performs speed change control of an automatic transmission may be provided, for example.

The brake processor 9 may control various actuators provided as the brake-related actuator 14 based on detection signals received from predetermined sensors in the sensor-operator unit 16 and operational input information received from predetermined operators in the sensor-operator unit 16, for example.

As the brake-related actuator 14, an actuator that performs a brake-related operation, such as a hydraulic control actuator that controls hydraulic pressure of an output from a brake booster to a master cylinder and hydraulic pressure inside a brake liquid pipe may be provided, for example.

The steering processor 10 may determine necessary steering torque based on data on a target steering angle received from the traveling control apparatus 2. The steering processor 10 may control the steering-related actuator 15 based on the determined steering torque to achieve necessary automated steering.

The map locator 4 may be configured to identify a current position of the vehicle 100 with high accuracy using the GNSS receiver 21 and the map DB 22. For example, the map locator 4 may be configured to identify not only a road on which the vehicle 100 is traveling but also a traveling lane on which the vehicle 100 is traveling.

For example, the traveling control apparatus 2 may recognize a presence of a merging lane of a limited highway including an expressway, and a start point and an end point of the merging lane, based on the information received from the map locator 4. Further, the traveling control apparatus 2 may recognize the lane on which the vehicle 100 is traveling.

Note that examples of the map locator 4 may include not only a locator in a narrow sense that is used to determine a traveling route in automated driving but also a navigation system using a GNSS. That is, the map locator 4 may be configured to acquire a current position and surrounding road information.

2. Outline of Merging Control

An outline of the ACC to be performed at the time of merging according to the present example embodiment is described below.

In the following, the vehicle 100 having the above-described configuration may be referred to as an "own vehicle 100" to distinguish the vehicle 100 from a merging vehicle 150 and a preceding vehicle 200.

Figure 2:
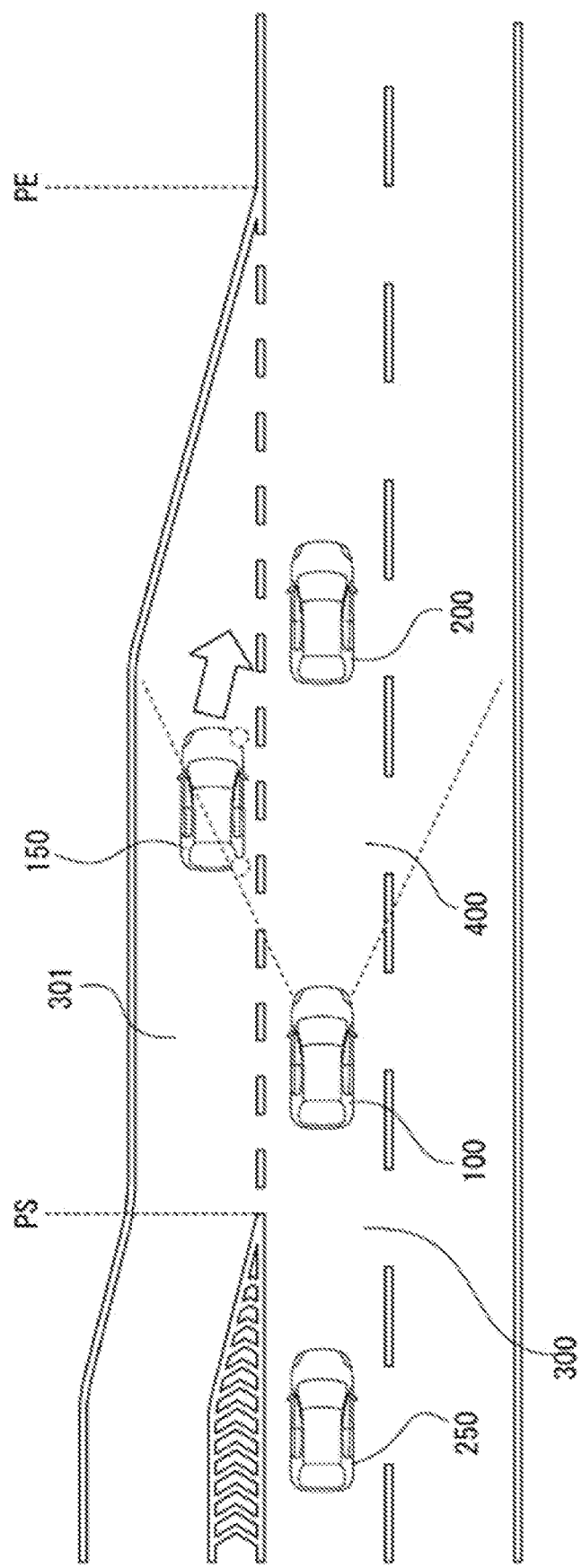
FIG. 2 is an explanatory diagram for explaining a merging vehicle set as a target to follow upon merging according one example embodiment.

FIG. 2 illustrates a situation where the own vehicle 100 is traveling on a traveling lane 300 of a limited highway. The traveling lane 300 has a merging lane 301 that merges with the traveling lane 300, for example.

In the situation illustrated in FIG. 2, the own vehicle 100 is traveling following the preceding vehicle 200 with the ACC, and the merging vehicle 150 traveling on the merging lane 301 and in front of the own vehicle 100 is trying to enter the traveling lane 300.

Note that a range defined by broken lines each diagonally extending in a forward direction from the own vehicle 100 indicates a view range 400 of the stereo camera 18.

The merging lane 301 may have a start point PS and an end point PE. The merging lane 301 may thus correspond to a traveling path extending from the start point PS to the end point PE.

The start point PS may be a position where vehicles are allowed to merge into the traveling lane 300, which is a main lane. For example, the start point PS may be a position where the merging lane 301 starts merging or connecting with the traveling lane 300. The end point PE may be a position where the merging lane 301 is no longer present.

In such a situation, the merging vehicle 150 is not set as a target to follow before entering the traveling lane 300, according to a logic of existing ACC, for example. The own vehicle 100 thus travels following the preceding vehicle 200 while maintaining the target inter-vehicular distance. This arises a situation where the own vehicle 100 travels in parallel to the merging vehicle 150, hindering the merging vehicle 150 from smoothly entering the traveling lane 300, in some cases.

Further, the own vehicle 100 sets the merging vehicle 150 as the target to follow after the merging vehicle 150 enters the traveling lane 30). In this case, an inter-vehicular distance from the own vehicle 100 to the target to follow is suddenly shortened, as seen from the own vehicle 100. Thus, an acceleration rate is changed based on the inter-vehicular distance suddenly shortened, according to the logic of the existing ACC. For example, the acceleration rate is changed to an acceleration rate taking a relatively large negative value (i.e., a deceleration rate), causing a relatively abrupt braking behavior of the own vehicle 100. This behavior of the own vehicle 100 is an unnatural braking operation of the own vehicle 100 as seen from a following vehicle 250.

That is, if the ACC to cause the own vehicle 100 to travel following the preceding vehicle 200 is continued regardless of the presence of the merging vehicle 150, the merging vehicle 150 is hindered from merging and the unnatural braking operation of the own vehicle 100 is recognized by the following vehicle 250. This hinders smooth traffic in the merging area.

To address these concerns, according to the present example embodiment, when it is determined by the map locator 4 that the own vehicle 100 is traveling in the vicinity of the merging area of on the traveling lane 300 of the limited highway, the merging vehicle 150 traveling on the merging lane 301 is set as a target of the ACC to follow before entering the traveling lane 300, for example.

In this case, the ACC is executed as the merge-to-follow process to accelerate or decelerate the own vehicle 100 taking into consideration the merging of the merging vehicle 150. This suppresses unnecessary deceleration of the own vehicle 100. In this control, a temporary reduction in the inter-vehicular distance caused by setting the merging vehicle 150 as the target to be followed by the own vehicle 100 is allowed.

In the merge-to-follow process, the merging vehicle 150 traveling on the merging lane 301 is set as the target to follow. However, when an acceleration rate of the merging vehicle 150, the target acceleration rate with respect to the merging vehicle 150, a relative speed between the merging vehicle 150 and the own vehicle 100, or a relative distance between the merging vehicle 150 and the own vehicle 100 is less than or equal to a predetermined threshold, the merging vehicle 150 may not be set as the target to follow or may be excluded from possible vehicles to be the target to follow. For example, a vehicle stopping on the merging lane 301 or a vehicle traveling at a significantly lower speed than the own vehicle 100 or the preceding vehicle 200 on the merging lane 301 may not be set as the target to follow because these vehicles are supposed not to merge into the traveling lane 300.

Further, the merge-to-follow process according to the present example embodiment may be applied to a situation where traffic congestion is generated.

Figure 3:
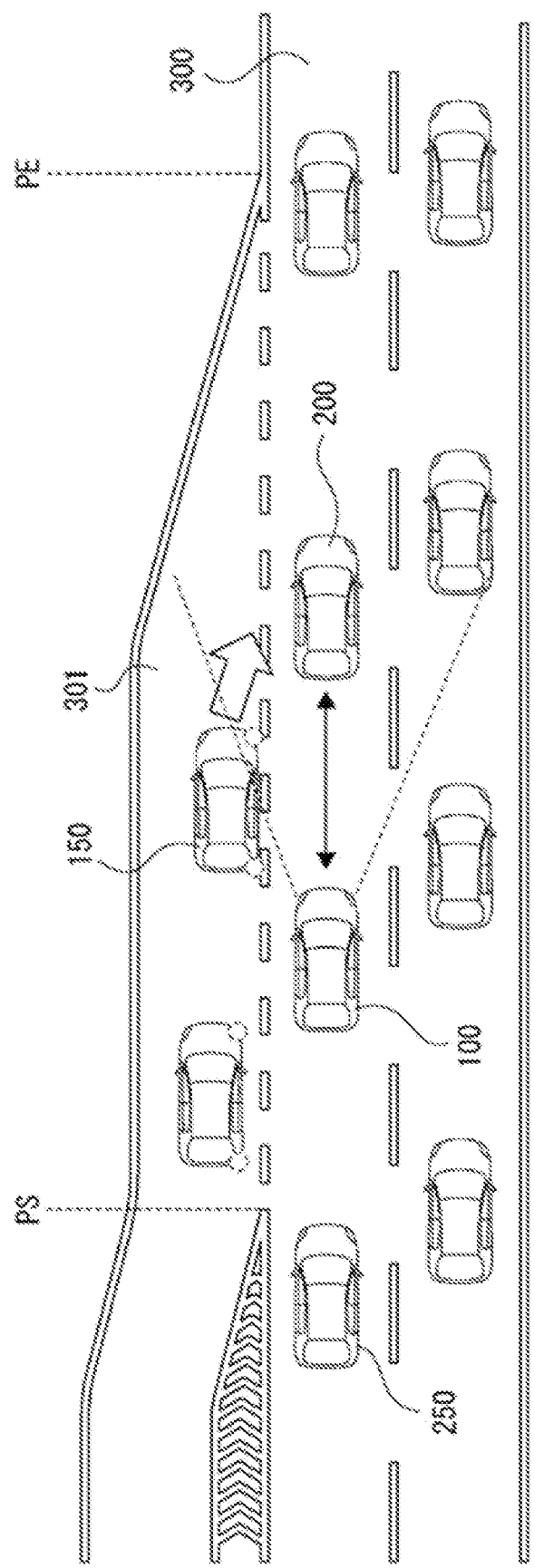
FIG. 3 is an explanatory diagram of control at the time of traffic congestion according to one example embodiment.

FIG. 3 illustrates an exemplary situation where traffic congestion is generated in the merging area.

If it is determined in the merge-to-follow process that traffic congestion has been generated, the inter-vehicular distance may be set at the shortest distance within a predetermined settable distance range, and the target inter-vehicular distance may be set at a value for the traffic congestion in the merging area. Further, an acceleration rate correction value may be calculated based on the relative speed between the own vehicle 100 and the merging vehicle 150 and a difference between the target inter-vehicular distance and an actual inter-vehicular distance, and the acceleration rate correction value may be added to the target acceleration rate determined according to the logic of ordinary ACC. This prevents the inter-vehicular distance from becoming excessively large.

A reason for this is that, if the ordinary ACC is performed when an inter-vehicular distance between each two adjacent vehicles is short due to traffic congestion, only the inter-vehicular distance in front of the own vehicle 100 is increased, hindering a smooth traffic flow.

Figure 4:
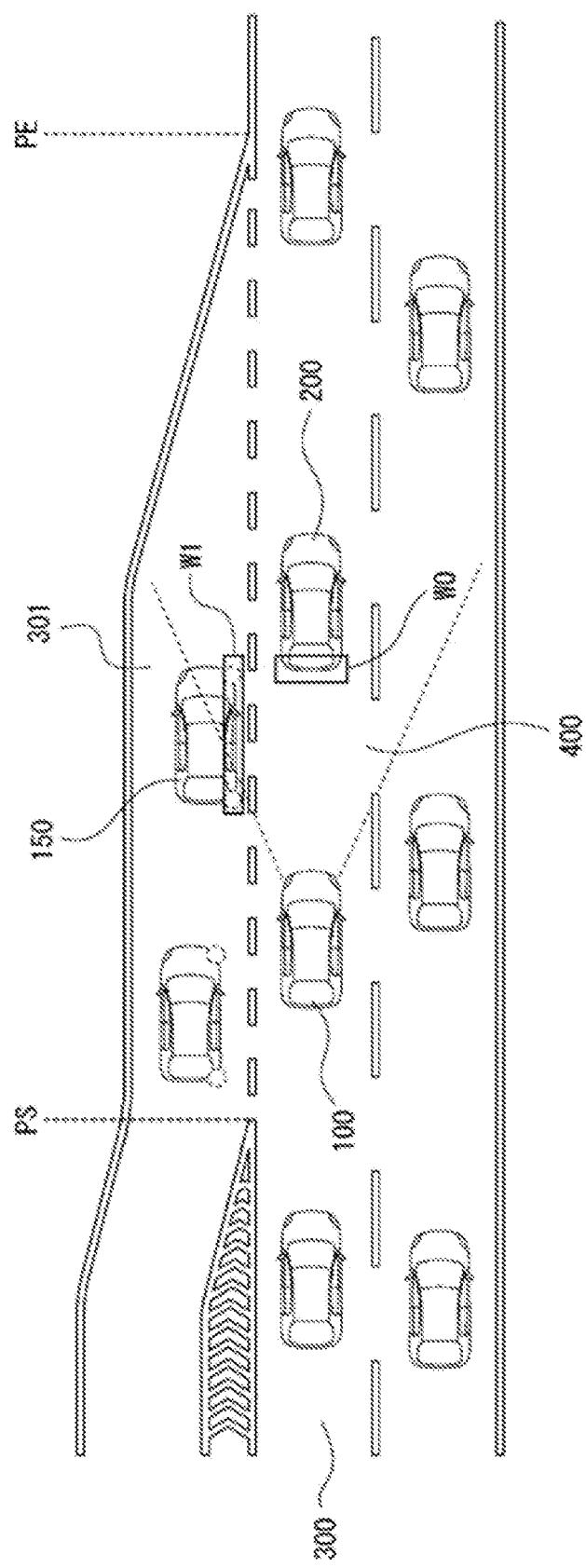
FIG. 4 is an explanatory diagram of the control at the time of traffic congestion according to one example embodiment.
Figure 5:
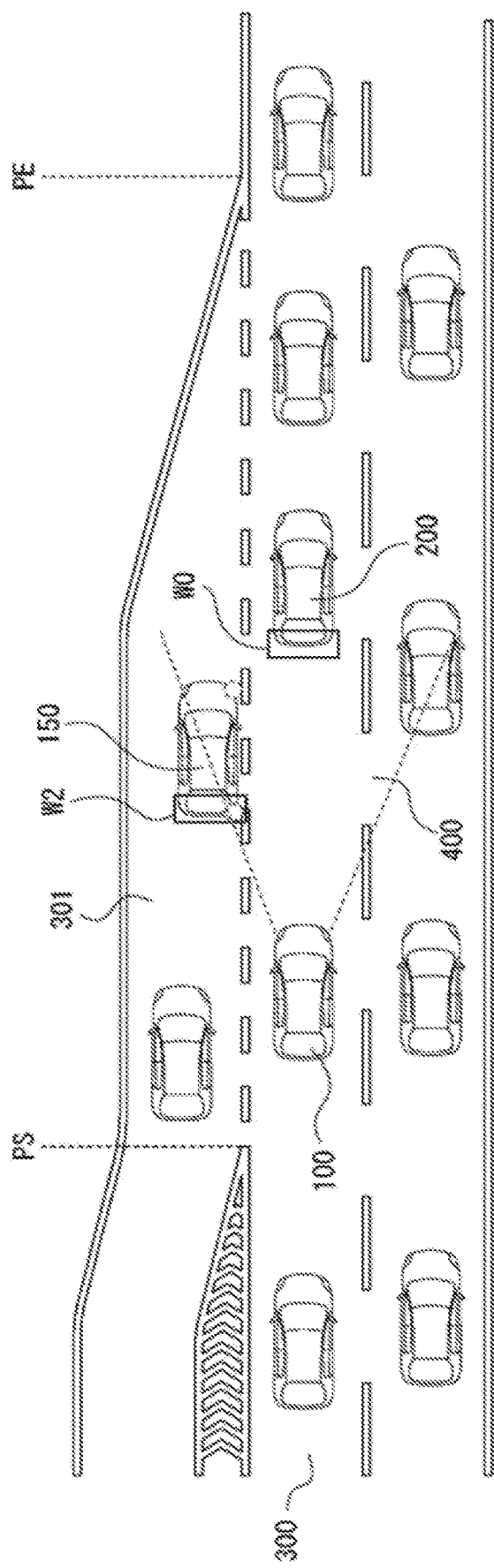
FIG. 5 is an explanatory diagram of the control at the time of traffic congestion according to one example embodiment.

FIG. 4 illustrates an exemplary situation where a side face of the merging vehicle 150 set as the target to follow is recognized. FIG. 5 illustrates an exemplary situation where arear face of the merging vehicle 150 set as the target to follow is recognized. The recognition of the side face or the rear face of the merging vehicle 150 may be based on the images acquired by the stereo camera 18.

In the example illustrated in FIG. 4, a rear face of the preceding vehicle 200 in a box W0 may be recognized while the own vehicle 100 travels following the preceding vehicle 200 with the ordinary ACC. In this state, when aside face of the merging vehicle 150 in a box W1 enters the view range 400 of the stereo camera 18, the traveling control apparatus 2 of the own vehicle 100 may recognize the presence of the merging vehicle 150 and set the merging vehicle 150 as the target of the ACC to follow.

In this case, the inter-vehicular distance is shortened by setting the merging vehicle 150 as the target to follow; however, a braking operation is not performed that abruptly increases the inter-vehicular distance to the inter-vehicular distance between the own vehicle 100 and the preceding vehicle 200 previously set, for example.

In the example illustrated in FIG. 5, a larger part of the merging vehicle 150 has entered the view range 400 of the stereo camera 18. The traveling control apparatus 2 of the own vehicle 100 may thus be able to recognize a rear face of the merging vehicle 150 in a box W2.

Thereafter, when it is determined that the merging vehicle 150 will merge into the position in front of the own vehicle 100 on the traveling lane 300 based on a predetermined condition, an appropriate target inter-vehicular distance determined based on the relative distance and the relative speed with respect to the merging vehicle 150 may be maintained. Note that, if the target acceleration rate determined according to the logic of the ordinary ACC takes a negative value (i.e., if the target acceleration rate indicates a deceleration rate), the inter-vehicular distance may be set at the shortest distance within the predetermined settable distance range in order to weaken the deceleration, for example. Further, in the case of traffic congestion, the target inter-vehicular distance may be set at the value for the traffic congestion in the merging area. Further, the acceleration rate correction value may be calculated based on the relative speed between the own vehicle 100 and the merging vehicle 150 and the difference between the target inter-vehicular distance and the actual inter-vehicular distance, and the acceleration rate correction value may be added to the target acceleration rate determined according to the logic of the ordinary ACC.

3. Exemplary Procedure

A description is given of an exemplary procedure for the merge-to-follow process to be performed by the traveling control apparatus 2 based on the concept described above.

Figure 6:
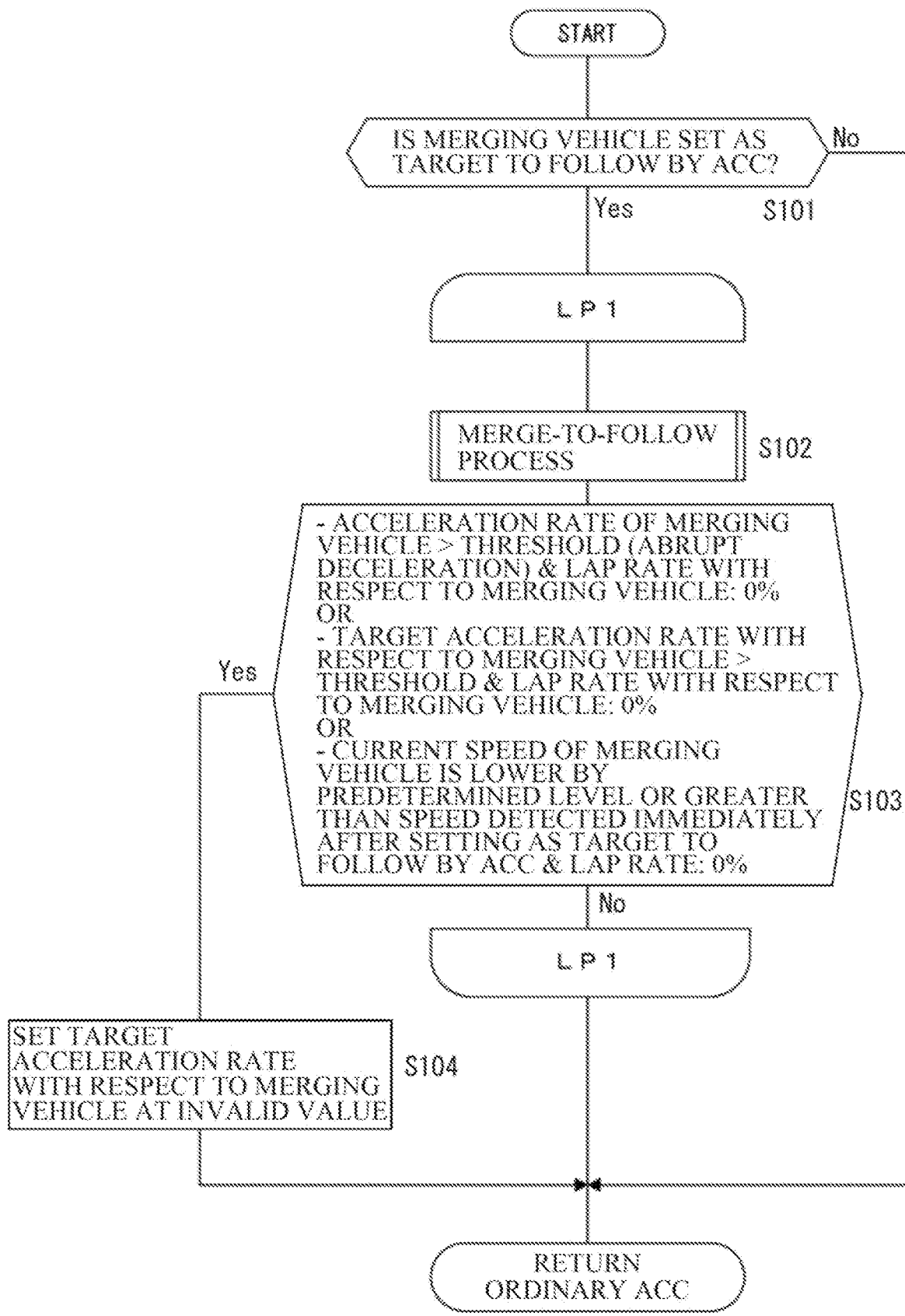
FIG. 6 is a flowchart of an ACC process including a merge-to-follow process according to one example embodiment.

FIG. 6 illustrates an exemplary procedure for a part of the ACC process to be performed by the traveling control apparatus 2 when the merging vehicle 150 is set as the target of the ACC to follow while the own vehicle 100 is traveling on a limited highway.

The procedure illustrated in FIG. 6 may be performed provided that the merging vehicle 150 has been set as the target of the ACC to follow by the control target setting unit 2a of the traveling control apparatus 2.

For example, the traveling control apparatus 2 may recognize an area of the limited highway in which the merging lane 301 is present based on data received from the map locator 4. When the own vehicle 100 reaches the area, the traveling control apparatus 2 may determine whether the own vehicle 100 is traveling on the traveling lane 3M) adjacent to the merging lane 301. If it is determined that the own vehicle 100 is traveling on the traveling lane 300 adjacent to the merging lane 301, a vehicle traveling on the merging lane 301 recognized based on the image captured by the stereo camera 18 may be set as the merging vehicle 150 that is the target of the ACC to follow. As illustrated in FIG. 4 described above, the merging vehicle 150 may be set as the target to follow even when only the side face of the merging vehicle 150 is recognized.

FIG. 6 is a flowchart of the procedure in which the merge-to-follow process is performed when the merging vehicle 150 is set as the target to follow as described above (Step S101: Yes).

When the merging vehicle 150 is not set as the target to follow while the ACC is executed (Step S101: No), the traveling control apparatus 2 may return the procedure from Step S101 to an ordinary ACC process. Herein, the term "ordinary ACC process" may refer to a process in winch acceleration or deceleration control is performed to maintain a predetermined target inter-vehicular distance with respect to the preceding vehicle 200 when the preceding vehicle 200 is present, and constant speed traveling control is performed to cause the own vehicle 100 to travel at a set speed when the preceding vehicle 200 is absent.

When the merging vehicle 150 is set as the target of the ACC to follow, the traveling control apparatus 2 may repeatedly execute loop processing LP1 including the merge-to-follow process at Step S102 and a determination process at Step S103. The loop processing LP1 may be repeated while the own vehicle 100 is traveling the area including the merging lane 301 and until a predetermined time after the own vehicle 100 passes by the end of the merging lane 301. That is, when the merging vehicle 150 is set as the target to follow after the time of arrival of the own vehicle 100 traveling on the traveling lane 300 at the start point PS of the merging lane 301, the loop processing LP1 may be repeatedly executed from the time of arrival of the own vehicle 100 at the start point PS of the merging lane 301 to the predetermined time after the time of passing of the own vehicle 100 by the end point PE of the merging lane 301.

However, the process may exit the loop processing LP1 depending on the result of the determination at the Step S103 described below.

Figure 7:
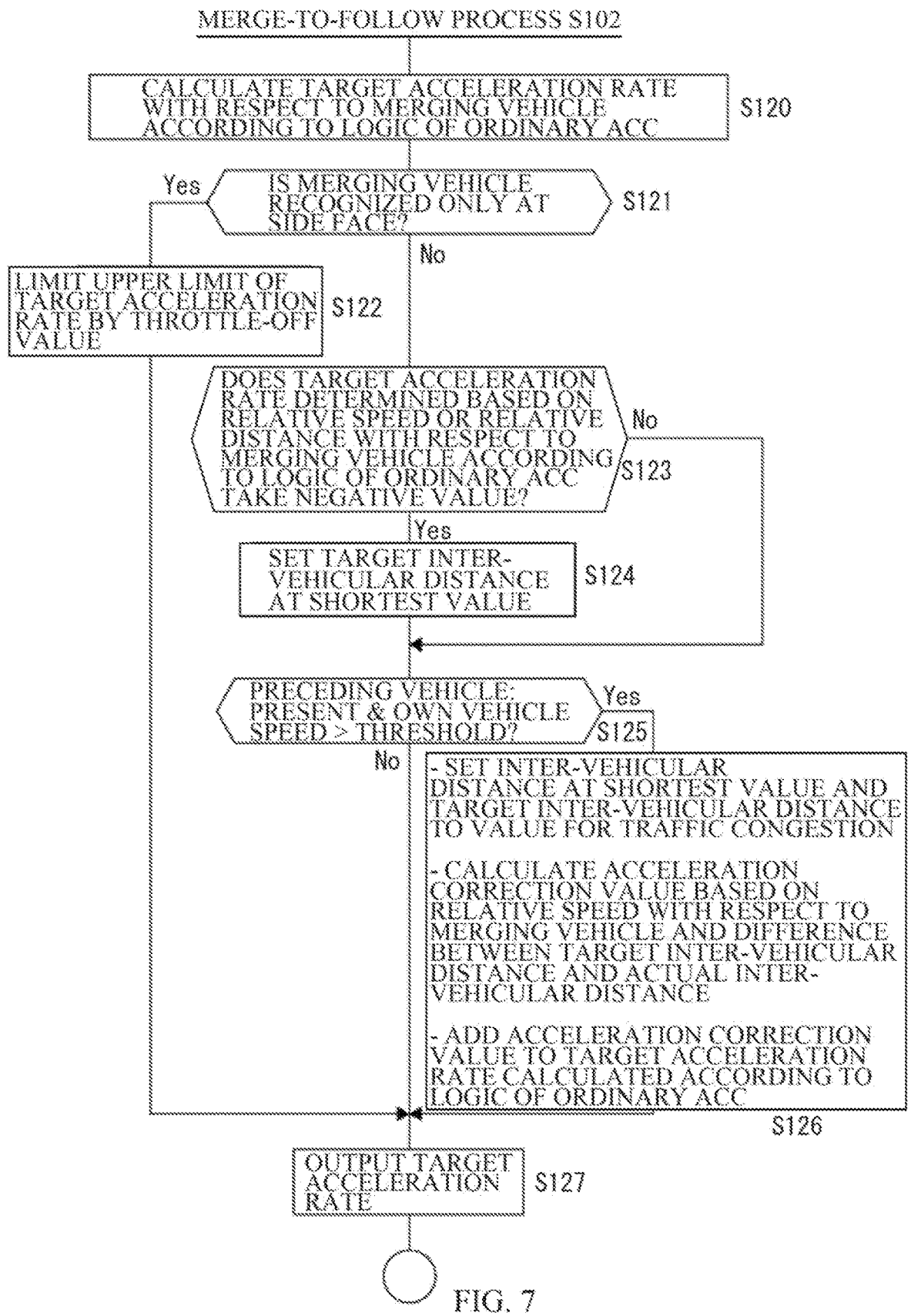
FIG. 7 is a flowchart of the merge-to-follow process according to one example embodiment.

FIG. 7 illustrates an example of the merge-to-follow process at Step S102 to be executed as the loop processing LP1. The procedure illustrated in FIG. 7 may be executed by the following control unit 2b of the traveling control apparatus 2.

In Step S120, the traveling control apparatus 2 may calculate a target acceleration rate with respect to the merging vehicle 150 according to the logic of the ordinary ACC. That is, the target acceleration rate with respect to the merging vehicle 150 set as the target to follow may be calculated according to a similar logic of calculation to that for the target acceleration rate with respect to the preceding vehicle 200 that has been followed by the own vehicle 100 before.

In Step S121, the procedure to be performed by the traveling control apparatus 2 may branch based on whether the merging vehicle 150 set as the target to follow is recognized only at its side face or its rear face.

When it is determined that the merging vehicle 150 is recognized only at its side face (Step S121: Yes), the traveling control apparatus 2 may cause the procedure to proceed to Step S122. In Step S122, the traveling control apparatus 2 may limit an upper limit of the target acceleration rate with a throttle-off value.

When the merging vehicle 150 set as the target to follow is recognized only at its side face, it may be estimated that the merging vehicle 150 is traveling slightly in front of the own vehicle 100 on the merging lane 301. In this case, the inter-vehicular distance may be abruptly shortened as compared with the inter-vehicular distance between the own vehicle 100 and the preceding vehicle 200 that the own vehicle 100 has followed before. In this state, if the target acceleration rate calculated in Step S120 is zero (0) or greater, and acceleration or constant-speed traveling is thus performed, the acceleration or the constant-speed traveling of the own vehicle 100 may hinder the merging vehicle 150 from merging into the position in front of the own vehicle 100 despite that the merging vehicle 150 is allowed to merge into the position in front of the own vehicle. Accordingly, the upper limit of the target acceleration rate calculated in Step S120 may be limited to the value corresponding to throttle-off to thereby allow the merging vehicle 150 to easily merge into the position in front of the own vehicle 100.

After the upper limit of the target acceleration rate is limited as described above, the target acceleration rate may be outputted in Step S127. That is, a braking operation based on the target acceleration rate may be performed in the ACC.

In contrast, when it is determined in Step S121 that the merging vehicle 150 is recognized at its rear face (Step S121: No), the traveling control apparatus 2 may cause the process to proceed to Step S123. In this case, the traveling control apparatus 2 may determine whether the target acceleration rate determined based on the relative speed or the relative distance with respect to the merging vehicle 150 according to the logic of the ordinary ACC takes a negative value.

When the target acceleration rate calculated based on the relative speed or the relative distance with respect to the merging vehicle 150 in Step S120 described above takes a negative value, it may be determined that deceleration is to be performed.

When the merging vehicle 150 is detected at its rear face, it may be determined that it is the time immediately before the merging vehicle 150 enters in front of the own vehicle 100 on the traveling lane 300 or the time when the merging vehicle 150 is in the act of entering in front of the own vehicle 100 on the traveling lane 300. Accordingly, deceleration is to be performed to maintain a certain inter-vehicular distance. However, if the same target inter-vehicular distance as that in ordinary traveling is maintained at the time of merging, an inter-vehicular distance longer than necessary may be set in the merging area, resulting in braking greater than necessary.

Accordingly, if it is determined in Step S123 that deceleration is to be made (Step S123: Yes), the traveling control apparatus 2 may cause the process to proceed to Step S124 in which the target inter-vehicular distance is set at the shortest value within the settable distance range.

If it is determined in Step S123 that the target acceleration rate does not take a negative value (Step S123: No), Step S124 may be skipped.

Thereafter, in Step S125, the traveling control apparatus 2 may determine whether the preceding vehicle 200 is present on the traveling lane 300 on which the own vehicle 100 is traveling and whether the speed of the own vehicle 100 is less than a predetermined threshold. The threshold may beset at a value within a range from 20 km/h to 40 km/h, for example. That is, a determination as to whether traffic congestion has been generated may be made in Step S125.

Note that the determination in Step S125 may be made with setting hysteresis. For example, the determination may be made when a condition that the own vehicle 100 is traveling at a speed lower than 40 km/h is satisfied, while the determination may be cancelled when a condition that the own vehicle 100 is traveling at a speed of 50 km/h or higher is satisfied. This prevents hunting of conditions while the own vehicle 100 is traveling at a speed around 40 km/h.

When these conditions are satisfied (Step 125: Yes), it may be determined that traffic congestion has been generated, and the traveling control apparatus 2 may cause the process to proceed to Step S126. In Step S126, the traveling control apparatus 2 may set the inter-vehicular distance to the shortest value within the settable distance range, and change the target inter-vehicular distance to a set value for the traffic congestion in the merging area.

The set value for traffic congestion may be a short distance to be set when the inter-vehicular distance between two adjacent vehicles is shortened due to traffic congestion. For example, the set value for traffic congestion may be temporarily set as an inter-vehicular distance shorter than a target inter-vehicular distance determined in the ordinary ACC.

Further, in Step S126, the traveling control apparatus 2 may calculate the acceleration rate correction value based on the relative speed with respect to the merging vehicle 150 and the difference between the target inter-vehicular distance and the actual inter-vehicular distance, and add the acceleration rate correction value to the target acceleration rate determined according to the logic of the ordinary ACC.

Note that the following cases may be assumed herein: the acceleration rate correction value taking a negative value may be added to the target acceleration rate taking a negative value; the acceleration rate correction value taking a negative value may be added to the target acceleration rate taking a positive value, the acceleration rate correction value taking a positive value may be added to the target acceleration rate taking a negative value: and the acceleration rate correction value taking a positive value may be added to the target acceleration rate taking a positive value. That is, acceleration or deceleration is performed such that an appropriate inter-vehicular distance, which is not larger than necessary, is maintained with respect to the merging vehicle 150 depending on situations at the time of merging in the traffic congestion.

After necessary processes among Steps S123 to S126 are executed depending on situations, the traveling control apparatus 2 may output the target acceleration rate in Step S127. That is, acceleration or deceleration is performed such that an appropriate inter-vehicular distance, which is not larger than necessary, is maintained with respect to the merging vehicle 150 and that braking larger than necessary is not performed.

The above-described process illustrated in FIG. 7 may be repeated as Step S102 in FIG. 6. While the process illustrated in FIG. 7 is repeated, the traveling control apparatus 2 may determine an acceleration rate of the merging vehicle 150 and a lap rate between the own vehicle 100 and the merging vehicle 150 in Step S103 illustrated in FIG. 6.

Figure 8A:
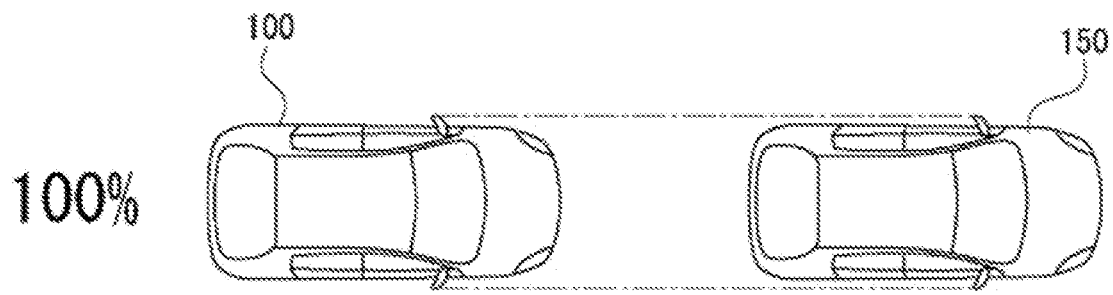
FIGS. 8A to 8C are explanatory diagrams for describing a lap rate.
Figure 8B:
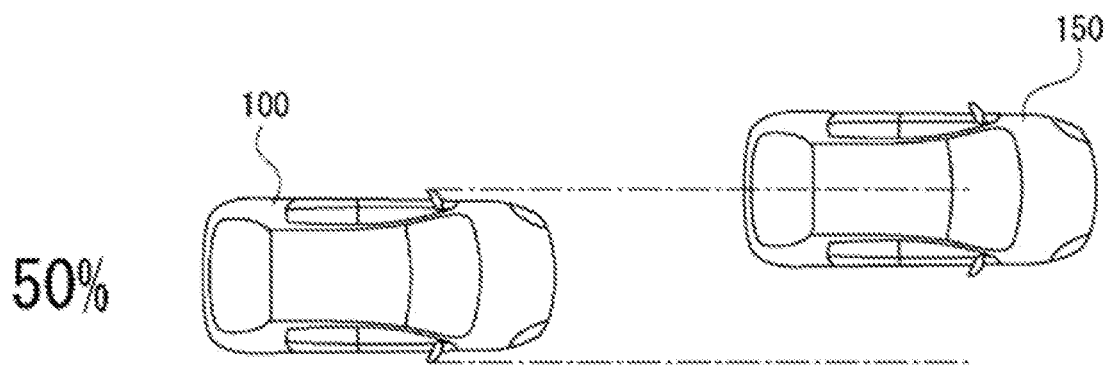
Figure 8C:
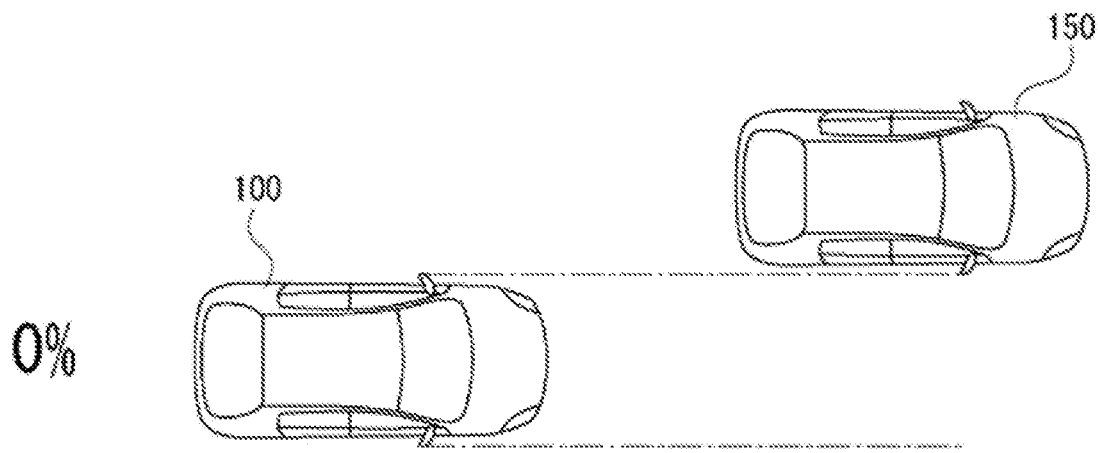

A definition of the lap rate is illustrated in FIGS. 8A to 8C. The lap rate may indicate the degree of overlapping between a position of the own vehicle 100 in a width direction and a position of the merging vehicle 150 in the width direction. As illustrated in FIG. 8A, the lap rate is 100% when the position of the own vehicle 100 and the position of the merging vehicle 150 are completely aligned with each other. As illustrated in FIG. 8B, the lap rate is 50% when a half of the width of the own vehicle 100 overlaps with a half of the width of the merging vehicle 150. As illustrated in FIG. 8C, the lap rate is 0% when the width of the own vehicle 100 and the width of the merging vehicle 150 do not overlap with each other.

When the lap rate is determined to be 0% in Step S103 in FIG. 6, the merging vehicle 150 may be determined to be still present on the merging lane 301.

Note that a threshold of the acceleration rate of the merging vehicle 150 may take a negative value. Thus, when the acceleration rate of the merging vehicle 150 is less than the threshold, the merging vehicle 150 may undergo abrupt deceleration. That is, the fact that the acceleration rate of the merging vehicle 150 is less than the threshold means that the merging vehicle 150 is undergoing abrupt deceleration. In addition, a determination as to whether the merging vehicle 150 is in a stopped state may be made based on a relative speed.

When the lap rate is 0% and the acceleration rate of the merging vehicle 150 is less than the threshold (Step S103: Yes), it may be estimated that the merging vehicle 150 has no intention to merge.

In this case, the traveling control apparatus 2 may cause the procedure to exit the loop processing LP1 and proceed to Step S104. In Step S104, the target acceleration rate calculated in Step S102 with setting the merging vehicle 150 as the target to follow may be invalidated, following which the procedure may return to the ordinary ACC process. That is, the merging vehicle 150 may be excluded from the target of the ACC to follow, and the procedure may return to the ordinary ACC process in which the preceding vehicle 200 is set as the target to follow.

Also when the lap rate is 0% and the target acceleration rate with respect to the merging vehicle 150 is less than the threshold (Step S103: Yes), the traveling control apparatus 2 may cause the procedure to exit the loop processing LP1 and proceed to Step S104, taking into consideration a case where the merging vehicle 150 will not be accurately accelerated as indicated by an actual acceleration rate.

Also when the lap rate is 0% and a current speed of the merging vehicle 150 is lower by a predetermined level or greater than the speed detected immediately after the setting of the merging vehicle 150 as the target of the ACC to follow, the traveling control apparatus 2 may cause the procedure to exit the loop processing LP1 and proceed to Step S104 to prevent the own vehicle 100 from decelerating and stopping following the merging vehicle 150 decelerating slowly and stopping.

Also in these cases, the procedure may return to the ordinary ACC process in which the preceding vehicle 200 is set as the target to follow.

4. Effects of Example Embodiment and Modification Example

According to the foregoing example embodiment, the following effects are obtained.

The traveling control apparatus 2 according to the foregoing example embodiment includes a computer device that performs the ACC that causes the own vehicle 100 to travel at a set constant vehicle speed or to travel following the preceding vehicle 200. The computer device of the traveling control apparatus 2 includes the control target setting unit 2a that sets the merging vehicle 150 detected on the merging lane 301 as a target of the ACC to follow. The computer device of the traveling control apparatus 2 further includes a following control unit 2b that performs the merge-to-follow process when the merging vehicle 150 is set as the target to follow. In the merge-to-follow process, an inter-vehicular distance is allowable which is shorter than the target inter-vehicular distance set in the control that causes the own vehicle 100 to travel following the preceding vehicle 200 traveling on the same traveling lane on which the own vehicle 100 travels.

When the merging vehicle 150 enters the traveling lane 300 while the own vehicle 100 is traveling following the preceding vehicle 200 traveling on the same lane as the own vehicle 100 at the target inter-vehicular distance with the ordinary ACC, a situation arises where the own vehicle 100 undergoes abrupt deceleration to keep the target inter-vehicular distance with respect to the merging vehicle 150 set as the target to follow. To avoid the occurrence of such a situation, the merging vehicle 150 traveling on the merging lane 301 may be set as the target of the ACC to follow before merging, following which the merge-to-follow process may be performed. As described with reference to FIG. 7, the merge-to-follow process may employ an algorithm in which a shorter target inter-vehicular distance is allowable. This prevents the own vehicle 100 from undergoing abrupt deceleration to keep the inter-vehicular distance with respect to the merging vehicle 150 during the ACC. Accordingly, it is possible to decelerate the own vehicle 100 more smoothly as seen from the following vehicle 250, and prevent the inter-vehicular distance with respect to the merging vehicle 150 from becoming larger than necessary. This enhances safety in traveling with the ACC without hindering a natural traffic flow in the merging area.

This reduces the necessity of driver's operation of turning off the ACC at the time of merging to respond to the merging vehicle 150, improving convenience of traveling with the ACC.

Further, since the merging vehicle 150 is set as the target of the ACC to follow while the merging vehicle 150 is traveling on the merging lane 301, it is possible to prevent the own vehicle 100 from traveling in parallel to the merging vehicle 150 and hindering merging of the merging vehicle 150. As a result, smooth merging of the merging vehicle 150 is facilitated.

Further, eliminating excess brake control of the own vehicle 100 upon merging of the merging vehicle 150 into a position in front of the own vehicle 100 contributes to an improvement in fuel efficiency of the own vehicle 100.

In the foregoing example embodiment, when the side face of the merging vehicle 150 set as the target to follow is recognized but the rear face of the merging vehicle 150 is not recognized, the upper limit of the target acceleration rate in the ACC may be limited to the value corresponding to throttle-off, in the merge-to-follow process (refer to Step S122 in FIG. 7).

When the side face of the merging vehicle 150 is recognized but the rear face of the merging vehicle 150 is not recognized, it may be estimated that the merging vehicle 150 traveling on the merging lane 301 has an intention to merge. Accordingly, a shorter inter-vehicular distance may be temporarily allowed rather than increasing the inter-vehicular distance with respect to the merging vehicle 150 set as the target of the ACC to follow in a hurry. Thereafter, the inter-vehicular distance may be gradually increased to facilitate smooth merging. For this purpose, the upper limit of the target acceleration rate (e.g., the acceleration rate having a negative value to decelerate in this case) may be limited to the value corresponding to throttle-off. This allows the own vehicle 100 to gradually decelerate to increase the inter-vehicular distance without using braking by a brake system as little as possible. Accordingly, it is possible to cause the own vehicle 100 to travel naturally as seen from the following vehicle, generating a situation where the merging vehicle 150 makes it possible to merge smoothly.

As described above, the control in which a shorter the inter-vehicular distance is temporarily allowable using the throttle-off without operating the braking system value may be performed whenever possible. However, when brake control is necessary to allow the merging vehicle to enter, a minimum target acceleration rate may be calculated based on the relative speed with respect to the merging vehicle 150, the positional relationship with the merging vehicle 150, and the speed or acceleration rate of the own vehicle 100, and deceleration control based on the calculated target acceleration rate may be performed.

In the foregoing example embodiment, when the rear face of the merging vehicle 150 set as the target to follow is recognized and it is determined based on the relative speed and the inter-vehicular distance between the merging vehicle 150 and the own vehicle 100 that deceleration is to be made, the target inter-vehicular distance may be changed to a smaller value in the merge-to-follow process (refer to Steps S123 and S124 in FIG. 7).

When the rear face of the merging vehicle 150 is recognized, it may be estimated that the merging vehicle 150 is about to start merging or in the middle of merging. In this case, if the target inter-vehicular distance remains set at the ordinary setting value, an inter-vehicular distance larger than necessary is maintained with respect to the merging vehicle 150 to merge into the position in front of the own vehicle 100. To address this concern, it is possible to shorten the target inter-vehicular distance not to disturb a traffic flow without increasing the inter-vehicular distance larger than necessary.

In the foregoing example embodiment, when it is determined that traffic congestion has generated, the target acceleration rate may be set by changing the setting of the target inter-vehicular distance to the setting for traffic congestion, in the merge-to-follow process (refer to Steps S125 and S126 in FIG. 7).

During the traffic congestion, a smooth traffic flow is hindered by an inter-vehicular distance with respect to the merging vehicle 150 larger than necessary, in some cases. To address this concern, a shorter inter-vehicular distance may be set as the target inter-vehicular distance in the case of traffic congestion. This prevents the inter-vehicular distance between the merging vehicle 150 and the own vehicle 100 from becoming larger than necessary, enabling traveling control for merging depending on conditions of the traffic congestion.

In the foregoing example embodiment, in a case where the acceleration rate of the merging vehicle set as the target to follow is less than the predetermined threshold and where the lap rate between the merging vehicle and to the own vehicle is zero, the computer device invalidates the target acceleration rate determined with setting the merging vehicle as the target to follow (refer to Steps S103 and S104 in FIG. 6).

In a case where the acceleration rate of the merging vehicle 150 is less than the predetermined threshold and where the lap rate is zero, it may be estimated that the merging vehicle 150 is stopped or abruptly decelerated on the merging lane 301 and has no intention to merge. Accordingly, the target acceleration rate determined with setting the merging vehicle 150 as the target to follow may be invalidated. This makes it possible to prevent traveling of the own vehicle 100 from being disturbed by the vehicle having no intention to merge.

Note that the foregoing example embodiment is a non-limiting example of the disclosure, and various modification examples may be conceivable.

Further, a program that causes the computer device to perform the processes described above with reference to FIGS. 6 and 7 may be stored in a recording medium such as a non-volatile memory in the traveling control apparatus 2 or the vehicle control system 1. Alternatively, the program may be stored in a portable storage medium or may be downloaded from a server apparatus to the vehicle 100 via network communication.

One or both of the control target setting unit 2a and the following control unit 2b in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control target setting unit 2a and the following control unit 2b. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the control target setting unit 2a and the following control unit 2b in FIG. 1.

The invention claimed is:

1. A traveling control apparatus comprising a computer device configured to perform control that causes a first vehicle to travel at a set constant vehicle speed or to travel following a second vehicle traveling in front of the first vehicle, the computer device configured to:
   set a third vehicle detected on a merging lane as a target to follow, the merging lane merging with a traveling lane of the first vehicle; and
   perform, when the third vehicle is set as the target to follow, a merge-to-follow process in which an inter-vehicular distance is allowable which is shorter than a target inter-vehicular distance set in the control that causes the first vehicle to travel following the second vehicle traveling on the traveling lane of the first vehicle,
   wherein, when an acceleration rate of the third vehicle set as the target to follow is less than a predetermined threshold and a lap rate between the third vehicle and the first vehicle is zero, the computer device is configured to:
      invalidate a target acceleration rate determined with setting the third vehicle as the target to follow; and
      perform the control that causes the first vehicle to travel following the second vehicle traveling on the traveling lane of the first vehicle.

2. The traveling control apparatus according to claim 1, wherein, when a side face of the third vehicle set as the target to follow is recognized and a rear face of the third vehicle set as the target to follow is not recognized, the computer device is configured to limit an upper limit of the target acceleration rate to an acceleration rate corresponding to throttle-off in the merge-to-follow process.

3. The traveling control apparatus according to claim 2, wherein, when the rear face of the third vehicle set as the target to follow is recognized and it is determined based on a relative speed and an inter-vehicular distance between the third vehicle and the first vehicle that deceleration is to be made, the computer device is configured to change the target inter-vehicular distance to a smaller value in the merge-to-follow process.

4. The traveling control apparatus according to claim 2, wherein the computer device is configured to set, when determining that traffic congestion has been generated, the target acceleration rate by changing a setting of the target inter-vehicular distance to a setting for the traffic congestion in the merge-to-follow process.

5. The traveling control apparatus according to claim 1, wherein, when the rear face of the third vehicle set as the target to follow is recognized and it is determined based on a relative speed and an inter-vehicular distance between the third vehicle and the first vehicle that deceleration is to be made, the computer device is configured to change the target inter-vehicular distance to a smaller value in the merge-to-follow process.

6. The traveling control apparatus according to claim 5, wherein the computer device is configured to set, when determining that traffic congestion has been generated, the target acceleration rate by changing a setting of the target inter-vehicular distance to a setting for the traffic congestion in the merge-to-follow process.

7. The traveling control apparatus according to claim 1, wherein the computer device is configured to set, when determining that traffic congestion has been generated, the target acceleration rate by changing a setting of the target inter-vehicular distance to a setting for the traffic congestion in the merge-to-follow process.

8. A traveling control apparatus comprising a computer device configured to perform control that causes a first vehicle to travel at a set constant vehicle speed or to travel following a second vehicle traveling in front of the first vehicle, the computer device configured to:
  set a third vehicle detected on a merging lane as a target to follow, the merging lane merging with a traveling lane of the first vehicle; and
  perform, when the third vehicle is set as the target to follow, a merge-to-follow process in which an inter-vehicular distance is allowable which is shorter than a target inter-vehicular distance set in the control that causes the first vehicle to travel following the second vehicle traveling on the traveling lane of the first vehicle travels, wherein
  the computer device is configured to limit an upper limit of a target acceleration rate to an acceleration rate corresponding to throttle-off in the merge-to-follow process when a side face of the third vehicle set as the target to follow is recognized and a rear face of the third vehicle set as the target to follow is not recognized, and
  the computer device is configured to change the target inter-vehicular distance to a smaller value in the merge-to-follow process when the rear face of the third vehicle set as the target to follow is recognized and it is determined based on a relative speed and an inter-vehicular distance between the third vehicle and the first vehicle that deceleration is to be made.

\* \* \* \* \*